United States Patent [19]
Guichard et al.

[11] Patent Number: 5,341,167
[45] Date of Patent: Aug. 23, 1994

[54] VISUAL AND SOUND COMMUNICATION SYSTEM WITH REMOTE CONTROL MEANS

[75] Inventors: Jacques Guichard; Georges Buchner, both of Paris, France

[73] Assignee: France Telecom Etablissement Autonome de Droit Public, Paris, France

[21] Appl. No.: 161,083

[22] Filed: Dec. 3, 1993

Related U.S. Application Data

[63] Continuation of Ser. No. 857,261, Mar. 25, 1992, abandoned.

[30] Foreign Application Priority Data

Mar. 26, 1991 [FR] France ................... 91 03638

[51] Int. Cl.⁵ ........................... H04M 11/00
[52] U.S. Cl. ........................ 348/14; 348/734
[58] Field of Search ................ 379/96–99, 379/102, 440; 455/90; 348/14, 16, 20, 114, 734

[56] References Cited

U.S. PATENT DOCUMENTS 4,313,227 1/1982 Eder .
4,995,071 2/1991 Weber et al. .................... 379/54
5,086,510 2/1991 Guenther et al. ................ 455/90
5,173,936 12/1992 Ditzig et al. .................... 379/440

FOREIGN PATENT DOCUMENTS 0353143  1/1990  European Pat. Off. .
0382601  8/1990  European Pat. Off. .
2563674 10/1985 France .
2634610  1/1990  France ................... 379/53
63-204960 8/1988 Japan ................... 379/102
2228595  8/1990  United Kingdom .

OTHER PUBLICATIONS

Patent Abstracts of Japan, vol. 014, No. 451 (E-0984), Sep. 27, 1990, & JP-A-02 180 485, Jul. 13, 1990, Y. Hoshina, "Video Telephone Set".
Patent Abstracts of Japan, vol. 013, No. 433 (E-824), Sep. 27, 1989, & JP-A-01 160 286, Jun. 23, 1989, K. Kashiwagi, et al. "Still Picture Video Telephone System".
Patent Abstracts of Japan, vol. 014, No. 301 (P-1069), Jun. 28, 1990, & JP-A-02 096 212, Apr. 9, 1990, M. Tonami, "Position Input Device".

Primary Examiner—Wing F. Chan
Attorney, Agent, or Firm—Oblon, Spivak, McClelland, Maier & Neustadt

[57] ABSTRACT

A visual and sound telecommunication system includes an audiovisual terminal, a camera and a handset with earpiece and microphone. The handset has a remote control acting on the terminal and on the camera by way of the terminal.

1 Claim, 4 Drawing Sheets

VISUAL AND SOUND COMMUNICATION SYSTEM WITH REMOTE CONTROL MEANS

This application is a continuation of application Ser. No. 07/857,261, filed on Mar. 25, 1992, now abandoned.

BACKGROUND OF THE INVENTION

1. Field of the Invention

The invention relates to a visual and sound telecommunication system comprising a terminal, a camera, a screen and a handset with microphone and earpiece. The invention applies to video telephones, but also to any system such as videoconferencing or videomeeting or audioconferencing equipment.

b 2. Discussion of Background

During a communication by video telephony, it is important that the subject remain relatively immobile relative to the camera of the video telephone, so that his distant interlocutor has an image of suitable quality, and in particular an image which can be viewed without straining and without discomfort under optimal conditions. This is all the more true as the transmitted image is coded to reduce the output and to adapt it to that of the access of a digital system. The image in this case must develop slowly.

However, sometimes during a video telephone communication, an interlocutor has to perform operations by acting, for example, on mobile parts or keys of the video telephone.

For example, in the case of a video telephone equipped with a framing system controlled by the terminal, it is possible to have to type on the keyboard of the terminal to control the orientation of the camera and thus to modify its characteristic framing, or else it is possible to desire to modify the adjustments, in brightness or in contrast, of the display screen or of its video telephone, or to act on the position of the screen (case of liquid crystals which have a reduced observation cone), etc., or else it is possible to desire to put the unit in so-called "hands free" position by pressing a suitable key of the terminal.

These operations by the user are undesirable in that they interfere with the visual comfort of the interlocutor located at the other end.

In particular, the user may have to move so close to the terminal so that his face becomes too close to the camera and thus his image deteriorates in quality. Another possibility consists in that the user performing the manipulation makes his hand pass through the field of the camera, very close to it. Then as a result, the image available to the distant interlocutor is temporarily wholly or partially hidden, which is, of course, undesirable.

Finally, it is possible that the user leaves the field of the camera to perform the manipulations.

This invention makes it possible to eliminate these problems.

SUMMARY OF THE INVENTION

This invention has as its object a visual and sound telecommunication system, including a terminal, a camera, a display screen and a telephone handset having an earpiece and a microphone. The handset further has a device to provide for remote control of the terminal and of the camera from the terminal. This remote device includes an operating means making it possible for the user of the handset to obtain remote x, y movements of a cursor on the screen of the terminal and to "click" on an area, and to transmit coded remote control signals. The terminal has a means for receiving and decoding these signals.

According to an embodiment, the remote control means comprise means for generating electric signals in the form of modulated bursts.

It is then provided to transmit these remote control signals by the cord which connects the handset to the terminal.

According to a first variant embodiment, the cord comprises an additional wire to transmit the remote control signals.

According to a second variant embodiment, the cord comprises a wire for supplying the amplifiers of the electroacoustic transducers (microphone and earpiece) that are further used to transmit the remote control signals.

According to a second embodiment, the remote control means comprise means for generating modulated infrared signals.

The handset comprises one or preferably more infrared emitters, which makes it possible for the user to keep the handset close to his ear while being able to use the remote controls.

According to a third embodiment, the remote control means comprise means for generating modulated ultrasonic signals.

The handset then comprises an ultrasonic transmitter.

According to an aspect of the invention, the handset comprises operating means which can consist of keys of a keyboard.

The operating means can consist of a ball or a "joystick" or a "trackball."

According to a variant embodiment, the keyboard of the handset comprises keys for dialing.

According to an aspect of the invention, in the case where the keyboard does not comprise dialing keys, the dialing is performed by the keys of the remote control which designate the keys of a keyboard appearing on the screen.

According to one embodiment, the handset comprises a keyboard matrix connected to an encoder, which is connected to a serializer which controls either a signal modulator or the infrared emitter or emitters, or the ultrasonic transmitter.

BRIEF DESCRIPTION OF THE DRAWINGS

This invention will be understood better from the following description which is given in an illustrative and nonlimiting way and with regard to the drawings, in which.

DETAILED DESCRIPTION OF THE PREFERRED EMBODIMENT

As will be seen from the described examples of embodiment, the telephone handset makes it possible to generate coded remote control signals with rapid binary output thus making it possible to obtain a large selection of remote control functions. By way of example, twenty keys that can be pressed at a rapid rate are available.

Figure 1:
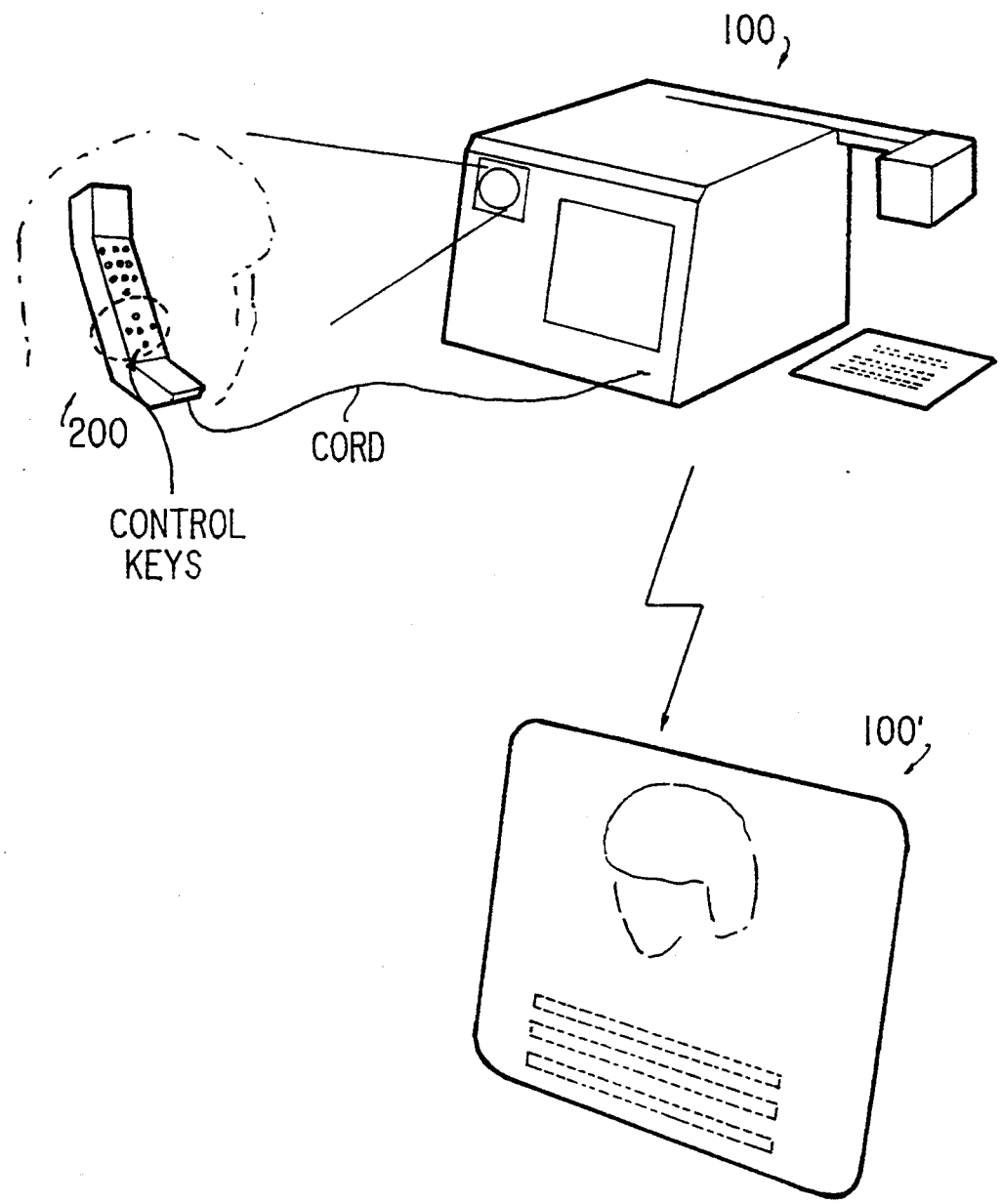
FIG. 1 represents a functional diagram of the telecommunication system according to the invention.

FIG. 1 makes it possible to illustrate a visual and sound telecommunication system according to the invention.

This system applies very particularly to the video telephony.

The user of video telephone 100 has at his disposal a terminal equipped with a camera (or with several cameras), a keyboard and a telephone handset 200. The camera makes it possible to send just as well the image of a local user or of several local users to one or more distant user or users, as the image of a text or graphics or an object to be displayed 100'.

According to the invention, the handset is equipped with remote control means making it possible to move remotely a cursor on the screen to designate the action to be accomplished on a menu and to "click" on an area, as it is possible to do with a mouse.

The remote control means make it possible, for example, to perform:

the zoom control or any action on the optics or the camera such as the color temperature, the manual balance of the whites, the secret image, the coding control to control the positioning of the user in front of the camera or else to operate by remote control the distant camera and the coding of the partner, the operating control on the management of calls, such as the transfer to a different station and all the services offered by the digital system, the control of the sound, for example, turning on the speaker placed on the terminal to operate in "hands free" mode or cutting off the sound.

Figure 2A:
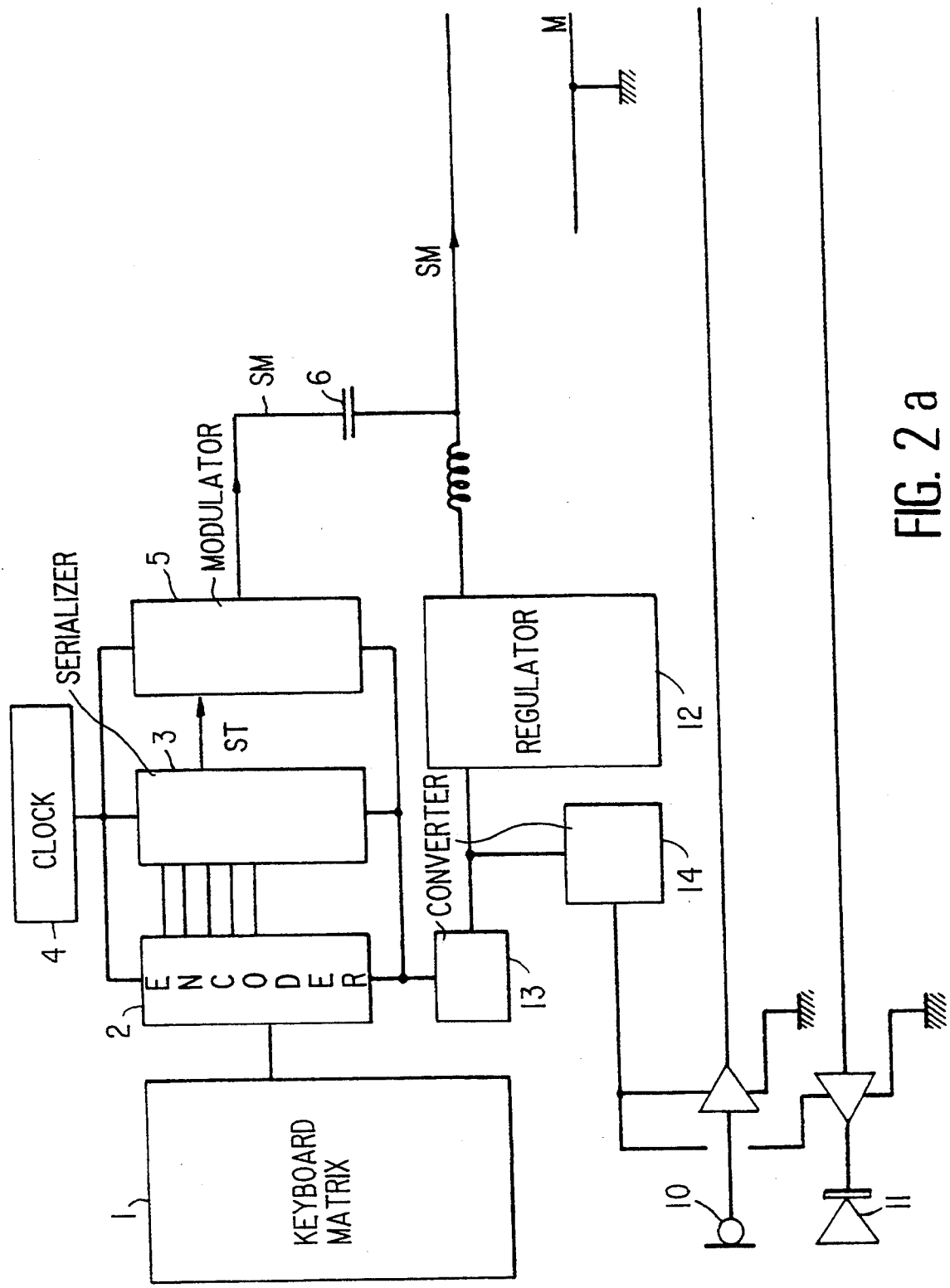
FIG. 2a represents a wiring diagram of the remote control means placed in the handset.

FIG. 2a represents a wiring diagram according to an embodiment given by way of example.

An embodiment is involved according to which the remote control signal is transmitted on a wire for supplying the amplifiers of the electroacoustic transducers (microphone and earpiece).

A standard keyboard matrix 1 connects the keys of the handset (or the ball) to an encoder 2 making it possible to obtain a logic signal in the form of a parallel binary word, as a function of the keys which the user has pressed.

Encoder 2 is connected to a serializer which transforms the parallel binary word into a serial word, represented by reference ST.

A clock 4 is provided to control serializer 3.

Logic signal ST is applied to the input of modulator 5 which delivers a signal in the form of a modulated burst with a frequency f (selected by way of example equal to 100 KHz). Also by way of example, the output of the modulator is 50 bits/sec.

Modulated burst SM charges a decoupling capacitor 6 which discharges on power supply line +V.

This wiring diagram further preferably comprises an impact self-inductor 7 making it possible to protect microphone 10 from any danger of applying a modulated signal which would impair the quality of the sound pickup.

For this purpose, self-inductor 7 is placed on the path of the power supply of microphone 10.

A voltage regulator 12 is also placed on this path, between self-inductor 7 and microphone 10.

It is also possible to provide voltage converters and filters, as represented in this diagram, to obtain the power supply voltages desired for circuits 2, 3 and 5.

In this diagram, a converter 13 to obtain voltage V3 from voltage V2 delivered by regulator 12 has been represented.

A converter 14 to obtain voltage V5 from voltage V2 has also been represented.

Figure 2B:
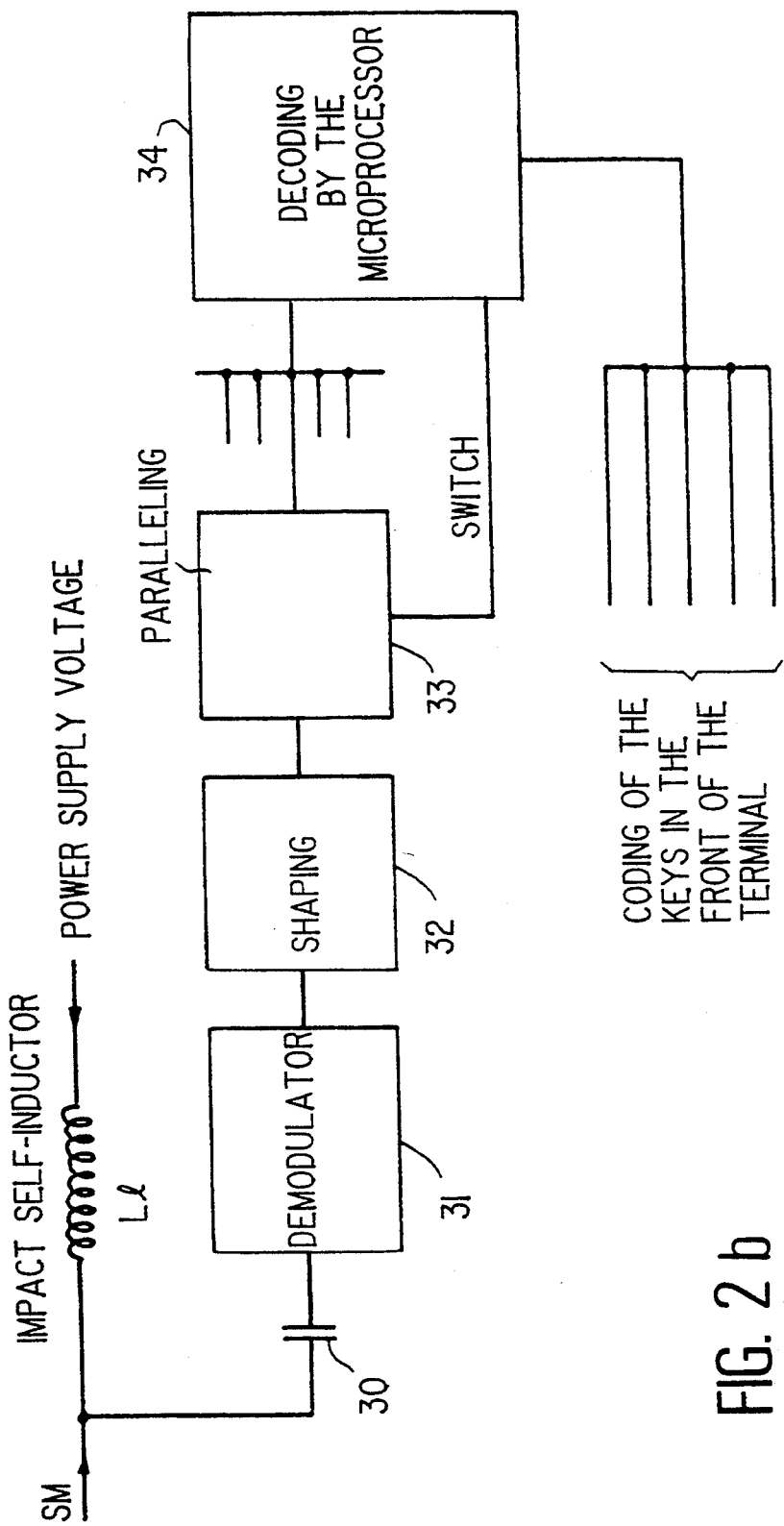
FIG. 2b represents a wiring diagram of the receiving means placed in the terminal.

FIG. 2b illustrates an embodiment of receiving means placed in the terminal.

These receiving means comprise a capacitor 30 which is charged and discharged from received signal SM.

A modulator 31 receives signal SM and demodulates it. The demodulated signal is applied to a shaping circuit 32. The output signal of circuit 32 is applied to a paralleling circuit 33. The words obtained in the outputs of circuit 33 are applied to the inputs of a decoding circuit or of a microprocessor 34 of the terminal which interprets them.

This microprocessor also receives the decoding of the keys in the front of the terminal. It also receives an interruption signal of circuit 33.

In the following examples, the terminal is connected to the handset by a cord.

Further, the cord comprises a power supply wire for supplying the amplifiers of the transducers (microphone and earpiece) which require a power supply.

These elements are selected to comply with the quality constraints imposed by the CCITT reference (blue books) P35, "Handset Telephone Stations, " and CCITT G722 "Audiofrequency coding at 7 kHz with an output that is less than or equal to 64 K.bit/sec."

Figure 3:
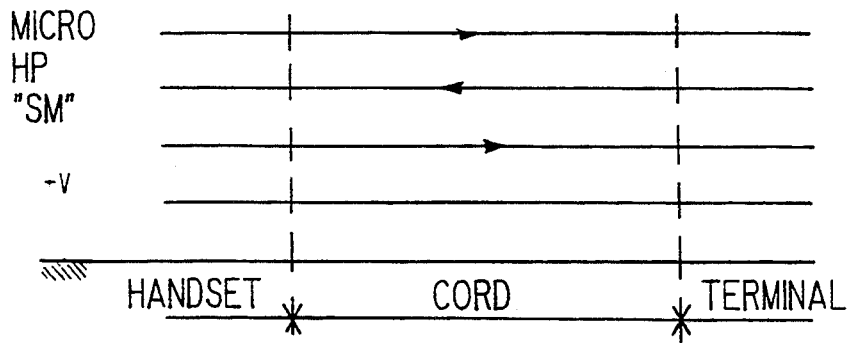
FIGS. 3a, 3b, 3c represent various possible configurations relative to the selected modes of transmission.
Figure 3:
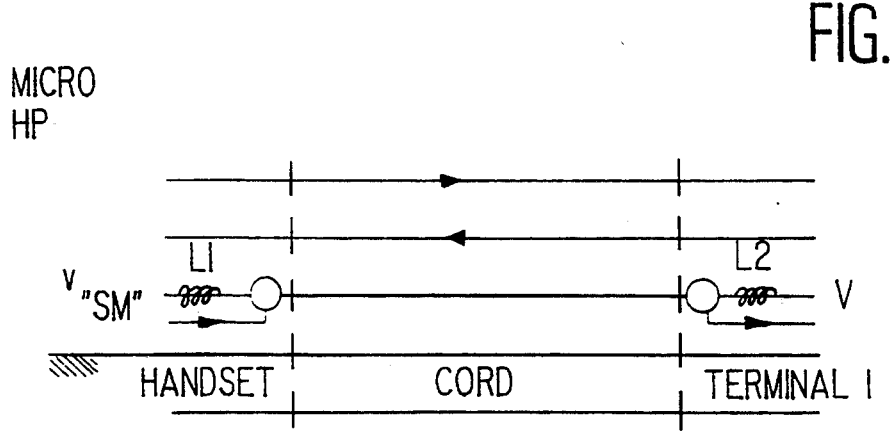
Figure 3:
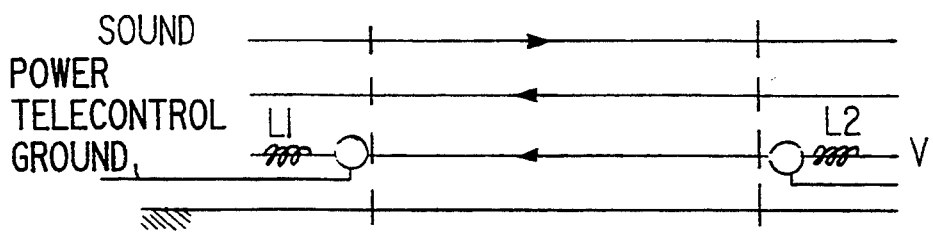

FIGS. 3a, 3b and 3c illustrate the various possible transmission modes of the coded remote control signals.

FIG. 3a represents the case of the transmission from the cord connecting the handset to the terminal, the cord comprising an additional wire for the logic, i.e., for the coded remote control signal.

The represented cord comprises five wires.

In FIG. 3b, the cord comprises four wires. The logic (coded signals) is transmitted on power supply wire +V.

In FIG. 3c, the cord comprises four wires.

What is claimed as new and desired to be secured by Letters Patent of the United States is:

1. A visual and sound telecommunication system including a terminal, a camera, and a handset with an ear piece and a microphone, said handset being connected to said terminal by a cord and said handset comprising a means for remote control of the terminal and of the camera from the terminal by a user of said handset thereby making it possible to transmit digital coded remote control signals to obtain remote, X, Y movements of a cursor on a screen of said terminal and to "click" on an area, said means for remote control including operating means which consists of control keys placed on an inside portion of said handset so that it may be easily used by said user when said ear pierce is close to an ear of said user or when said handset is remote from the user's face wherein said means for remote control comprises a keyboard matrix connecting the keys of the handset to an encoder for providing a parallel binary word as a function of selected pressed keys, said encoder being connected to a serializer for transforming said parallel binary word into a serial word and to provide a logic signal applied to an input of a modulator and wherein an output of said modulator provides a modulated burst which charges a decoupling capacitor on a power supply line, said means for remote control also including an impact self-inductor placed in a power supply line of a microphone making it possible to protect said microphone from the application of a modulated signal which would impair the quality of sound pick-up and said means for remote control further including a voltage regulator placed between said self-inductor and said microphone and a voltage converter means for providing power supply voltages.

* * * * *